US008478359B2

(12) United States Patent
Schell

(10) Patent No.: US 8,478,359 B2
(45) Date of Patent: Jul. 2, 2013

(54) USER INTERFACE TONE ECHO CANCELLATION

(75) Inventor: Stephan Vincent Schell, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 366 days.

(21) Appl. No.: 12/794,451

(22) Filed: Jun. 4, 2010

(65) Prior Publication Data

US 2011/0300897 A1    Dec. 8, 2011

(51) Int. Cl.
*H04M 1/00* (2006.01)
*H04B 15/00* (2006.01)

(52) U.S. Cl.
USPC ............... 455/570; 370/286; 379/406.06

(58) Field of Classification Search
USPC ........ 455/63.1, 67.11–69, 570; 370/276–278, 370/282–292; 379/387.01–397, 406.01–406.16
See application file for complete search history.

(56) References Cited

U.S. PATENT DOCUMENTS

| | | | |
|---|---|---|---|
| 5,099,472 A | | 3/1992 | Townsend et al. |
| 5,131,032 A | | 7/1992 | Esaki et al. |
| 5,459,786 A | * | 10/1995 | Tomiyori et al. ........ 379/390.01 |
| 5,479,502 A | * | 12/1995 | Ohga et al. ............... 379/406.08 |
| 5,600,714 A | * | 2/1997 | Eppler et al. ............. 379/406.08 |
| 5,633,936 A | * | 5/1997 | Oh .................................. 381/66 |
| 5,636,323 A | * | 6/1997 | Umemoto et al. ............ 704/226 |
| 6,385,176 B1 | | 5/2002 | Iyengar et al. |
| 6,751,203 B1 | | 6/2004 | Eshmawy et al. |
| 7,142,678 B2 | | 11/2006 | Falcon |
| 2007/0189508 A1 | | 8/2007 | Knutson et al. |
| 2009/0304177 A1 | | 12/2009 | Burns et al. |

FOREIGN PATENT DOCUMENTS

WO    WO-0169810 A2    9/2001

OTHER PUBLICATIONS

PCT International Search Report and Written Opinion (dated Feb. 4, 2011), International Application No. PCT/US2010/050071, International Filing Date—Sep. 23, 2010, (13 pages).
PCT International Preliminary Report on Patentability (dated Dec. 13, 2012), International Application No. PCT/US2010/050071, International Filing Date—Sep. 23, 2010, (9 pages).

* cited by examiner

*Primary Examiner* — Kashif Siddiqui
(74) *Attorney, Agent, or Firm* — Blakely, Sokoloff, Taylor & Zafman LLP

(57) ABSTRACT

A multi-function communications device has a processor that generates a user interface audible tone signal. The device also has a downlink digital signal processor, and an uplink digital signal processor. A mixer has an input to receive the downlink signal and another input to receive the user interface tone signal. The uplink processor has an acoustic echo canceller having an input to receive the uplink signal and another input to receive an output from the mixer. The echo canceller may reduce the amount of both the far-end user's speech and the user interface tone that may be present in the uplink signal. The mixer may be positioned within the chain of audio signal processors, or it may be positioned outside the chain. Other embodiments are also described and claimed.

27 Claims, 4 Drawing Sheets

USER INTERFACE TONE ECHO CANCELLATION

An embodiment of the invention relates to echo cancellation techniques within a communications device such as a smart phone and a cellular phone, for reducing the presence of an undesired reverberated audio signal in an uplink signal path of the device. Other embodiments are also described.

BACKGROUND

Multi-function communication devices such as smart phones allow their users to perform several other electronic tasks while simultaneously participating in a call. For instance, the user of the device an surf the Web, check her calendar, navigate a map, or find an address in a contacts list while simultaneously on a call with a far-end user.

Many users also like to enable sound feedback on their device, so that they can hear their own mouse clicks and message alerts clearly and easily. For example, when a message is received in the user's inbox, whether it be an email, voicemail, or an SMS text message, a prerecorded or synthesized audible tone is played through a speaker of the device to alert the user of the new message or update. Such clicks and alerts are referred to here generally as user interface ("UI") audible tones, referring generally to sound in the audible frequency range that is produced as a result of an event occurring in an application to which the user should be alerted (hence the reference to "user interface"). The user can typically set the loudness of such UI tones through, for instance, the volume setting switch typically found in such devices. More generally, UI tones can be any sound generated intentionally through a speaker of the device or an external speaker that is connected to the device, such as the built-in ear speaker, loudspeaker, headphones, or an externally connected speaker. UI tones can be clicks and alerts as noted previously, or they can be music or gaming audio, or audio mixes of these. Typically, the UI tones are of interest only to the near-end user of the device and are distracting or annoying to the far-end user on the other end of a voice call, and thus it is desirable to prevent the unintentional transmission of these UI tones to the far-end user.

SUMMARY

The acoustic design of the multi-function device should be such as to prevent the voice of a far-end user that is emitted from a speaker during a call, from coupling into the primary microphone (used to capture speech of the near-end user). There may be instances where the user has set the volume relatively high, such that the far-end user can hear the clicks and message alerts being played in the near-end user's device. This is due to reverberation or echo of these sounds, being picked-up by the primary microphone. This is undesirable because it would likely distract or even annoy the far-end user's conversation with the near-end user.

To reduce the likelihood of the far-end user being able to hear the near-end user's UI tones, an acoustic echo canceller that is present in an uplink signal processing path of the near-end user's device is given a digital signal path from the output of a UI tone mixer. The UI tone mixer receives at its inputs the downlink audio signal and a UI audible tone signal, where the latter may be generated based on prerecorded sound or it may be synthesized by an applications processor in the device. The echo canceller in this manner can reduce the undesired presence in the uplink signal transmitted to the far-end user of not only the echo of the far-end user's speech but also any echo of the near-end user's UI audible tones.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
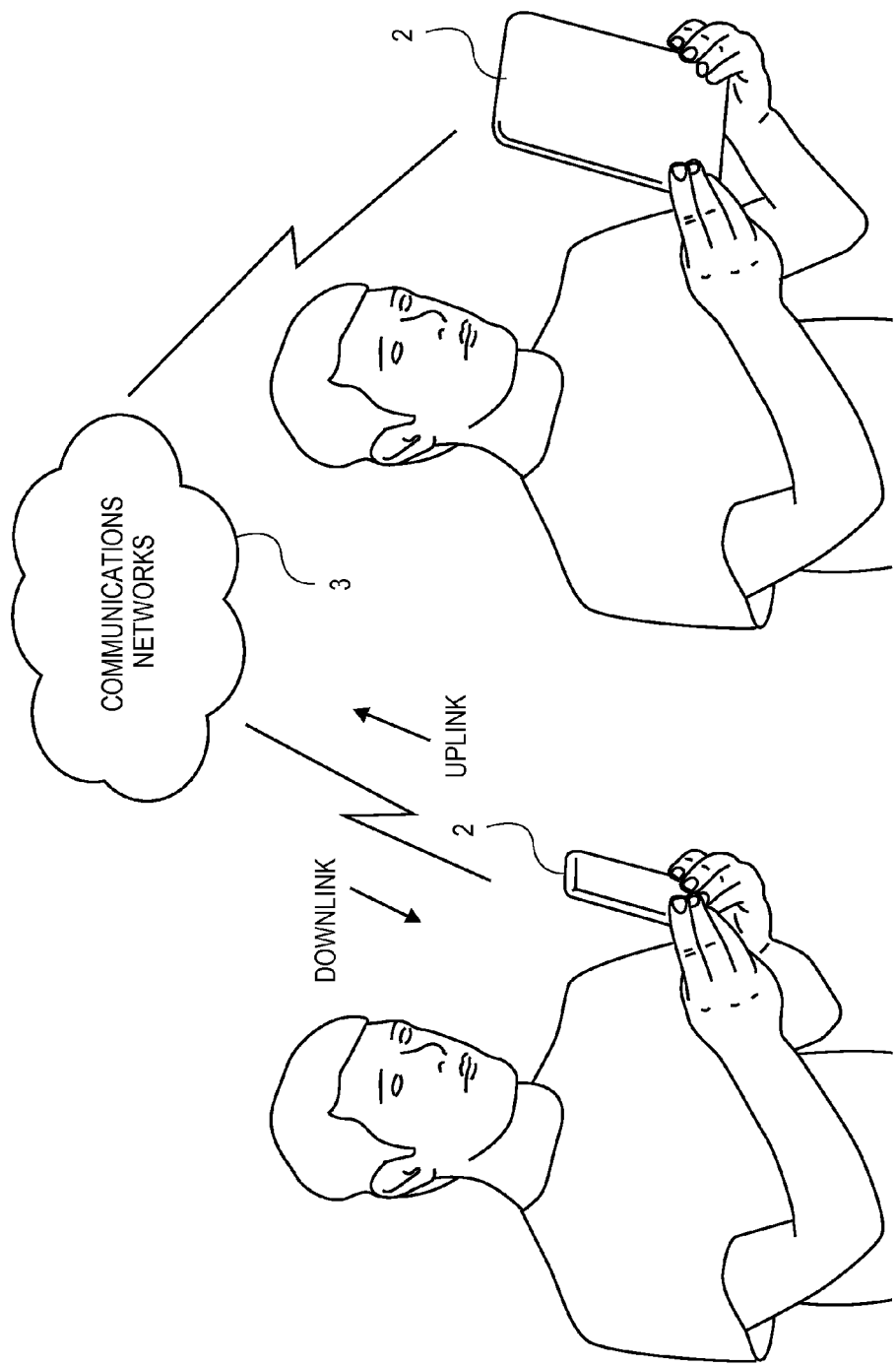
FIG. 1 shows a human user holding different types of a multi-function communications device, namely handheld or mobile devices such as a smart phone and a laptop or notebook computer, during a call.

FIG. 1 shows a human user holding different types of a communications device, in this example a multi-function handheld mobile device referred to here as a personal mobile device 2. In one instance, the mobile device is a smart phone or a multi-function cellular phone, shown in this example as being used in its speakerphone mode (as opposed to against the ear or handset mode). A near-end user is in the process of a call with a far-end user (depicted in this case as using a tablet-like computer also in speakerphone mode). The terms "call" and "telephony" are used here generically to refer to any two-way real-time or live communications session with a far-end user. The call is being conducted through one or more communication networks 3, e.g. a wireless cellular network, a wireless local area network, a wide area network such as the Internet, and a public switch telephone network such as the plain old telephone system (POTS). The far-end user need not be using a mobile device 2, but instead may be using a landline based POTS or Voiceover IP telephone station.

Figure 2:
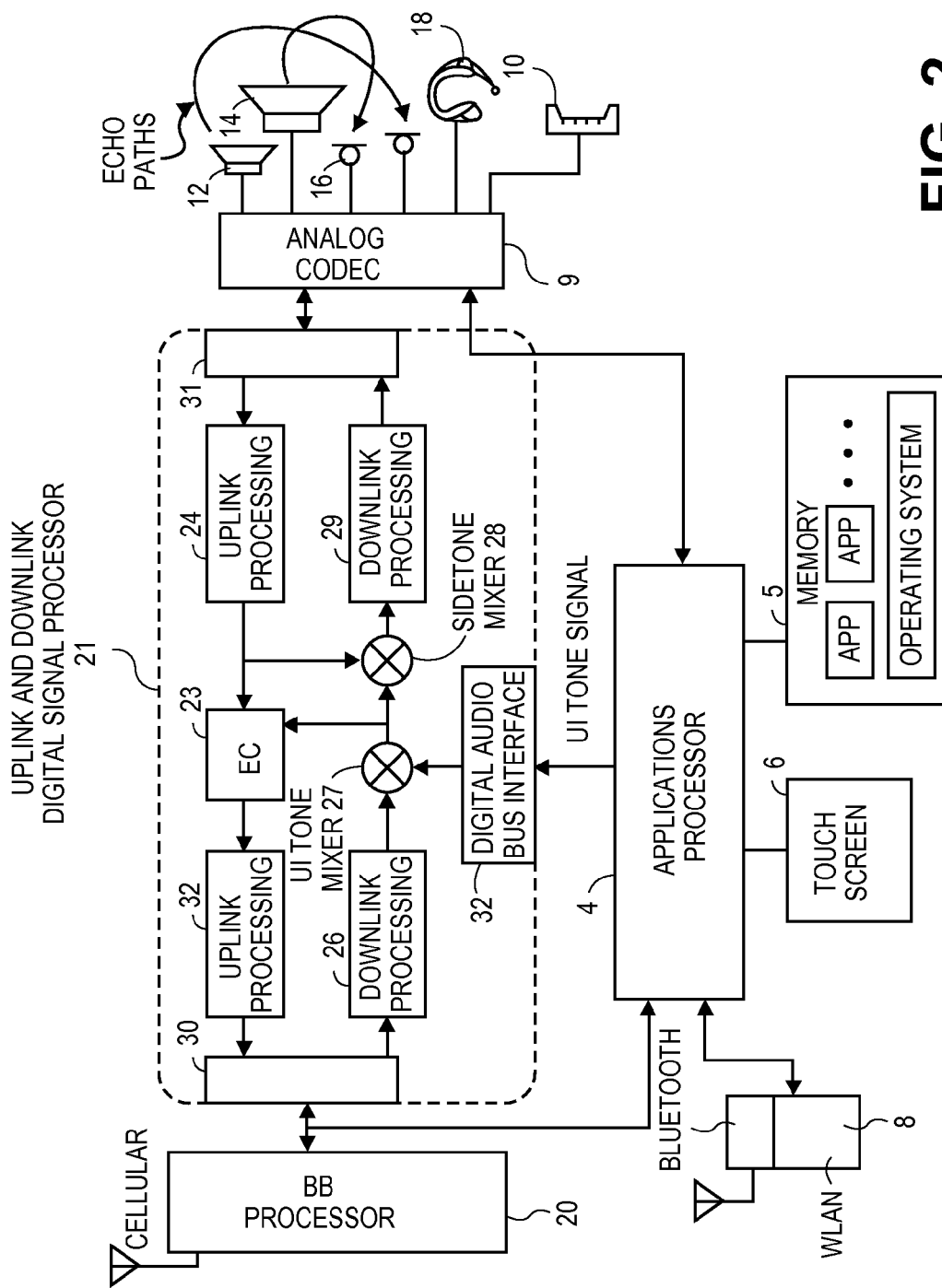
FIG. 2 is a block diagram of some of the functional unit blocks and hardware components in an example communications device in which a UI tone mixer is inside a chain of downlink digital audio processors.

Turning now to FIG. 2, a functional unit block diagram and some constituent hardware components of the mobile device 2, such as found in, for instance, an iPhone™ device by Apple Inc. are shown. Although not shown, the device 2 has a housing in which the primary mechanism for visual and tactile interaction with its user is a touch sensitive display screen (referred to here as a touch screen 6). As an alternative, a physical keyboard may be provided together with a display-only screen. The housing may be essentially a solid volume, often referred to as a candy bar or chocolate bar type, as in the iPhone™ device. An alternative is one that has a moveable, multi-piece housing such as a clamshell design, or one with a sliding, physical keypad as used by other cellular and mobile handset or smart phone manufacturers. The touch screen 6 displays typical features of visual voicemail, web browser, email, and digital camera viewfinder, as well as telephony features such as a virtual telephone number keypad (which may receive input from the user via virtual buttons and touch commands, as opposed to the physical keyboard option).

The user-level functions of the device are implemented under control of an applications processor 4 that has been programmed in accordance with instructions (code and data) stored in memory 5, e.g. microelectronic, non-volatile random access memory. The processor and memory are generically used here to refer to any suitable combination of programmable data processing components and data storage that can implement the operations needed for the various functions of the device described here. An operating system may be stored in the memory 5, along with application programs to perform specific functions of the device (when they are being run or executed by the processor 4). In particular, there is a telephony application that (when launched, unsuspended, or brought to foreground) enables the near-end user to "dial" a telephone number or address of a communications device of the far-end user to initiate a call using, for instance, a cellular protocol, and then to "hang-up" the call when finished.

For wireless telephony, several options are available in the device depicted in FIG. 2. For instance, a cellular phone protocol may be implemented by a cellular radio portion that includes a baseband processor 20 together with a cellular transceiver (not shown) and its associated antenna. The baseband processor 20 may be designed to perform various communication functions needed for conducting a call. Such functions may include speech coding and decoding and channel coding and decoding (e.g., in accordance with cellular GSM, and cellular CDMA). As an alternative to a cellular protocol, the device 2 offers the capability of conducting a call over a wireless local area network (WLAN) connection. A WLAN/Bluetooth transceiver 8 may be used for this purpose, with the added convenience of an optional wireless Bluetooth headset link.

The applications processor 4, while running the telephony application program, may conduct the call by transferring uplink and downlink digital audio signals (also referred to here as voice or speech signals) between the applications processor 4 or the baseband processor 20, and any user-selected combination of acoustic transducers. The downlink signal carries speech of the far-end user during a call, while the uplink signal contains speech of the near-end user that has been picked up by the primary microphone. The acoustic transducers include an earpiece speaker 12, a loudspeaker (speakerphone) 14, one or more microphones 16 including a primary microphone that is intended to pick-up the near-end user's speech primarily, and a wired headset 18 with a built-in microphone. The analog-digital conversion interface between these acoustic transducers and the digital downlink and uplink signals is accomplished by an analog codec 9. The latter may also provide coding and decoding functions for preparing any data that is to be transmitted out of the device 2 through a connector 10, and data that is received into the device 2 through the connector 10. This may be a conventional docking connector, used to perform a docking function that synchronizes the user's personal data stored in the memory 5 with the user's personal data stored in memory of an external computing system, such as a desktop computer or a laptop computer.

Still referring to FIG. 2, an uplink and downlink digital signal processor 21 is provided to perform a number of signal enhancement and noise reduction operations upon the digital audio uplink and downlink signals, to improve the experience of both near-end and far-end users during the call. The processor 21 may be a separate integrated circuit die or package, and may have at least three digital audio bus interfaces 30, 31, 32. These are used for transferring digital audio sequences to and from the baseband processor 20, applications processor 4, and analog codec 9. The digital audio bus interfaces may be in accordance with the I²S electrical serial bus interface specification, which is currently popular for connecting digital audio components and carrying pulse code modulated audio. Various types of audio processing functions may be implemented in the downlink and uplink signal paths of the processor 21. In an alternative embodiment, the three digital audio bus interfaces 30, 31, 32 may be implemented as distinct groups of logical audio channels within a single physical bus interface that supports multiple simultaneous connections, such as multi-channel PCM or the MIPI SlimBus.

The downlink signal path receives a downlink digital signal from either the baseband processor 20 or the applications processor 4 (originating as either a cellular network signal or a WLAN packet sequence) through the digital audio bus interface 30. The signal is buffered and subjected to various functions (also referred to here as a chain or sequence of functions), including some in downlink processing block 26, some in downlink processing block 29, UI tone mixer 27, and side tone mixer 28. Each of these may be viewed as an audio signal processor. For instance, processing blocks 26 and 29 may include one or more of the following: a noise suppressor, a voice equalizer, an automatic gain control unit, and a compressor or limiter. The downlink signal as a data stream or sequence is modified by each of these blocks, as it progresses through the signal path shown, until arriving at the digital audio bus interface 31, which transfers the data stream to the analog codec 9 (for playback through the speaker 12, 14, or headset 18).

The uplink signal path of the processor 21 is a chain of several uplink signal processors, including uplink processing blocks 24, 32 and an acoustic echo canceller (EC) 23. The blocks 24, 32 include at least one of the following: an equalizer, an automatic gain control unit, and a compander or expander. After passing through the last stage in block 32, the uplink data sequence is passed to the digital audio bus interface 30 which in turn transfers the data sequence to the baseband processor 20 for speech coding and channel coding, or to the applications processor 4 for speech coding and Internet Protocol packetization (prior to being transmitted to the far-end user's device).

The downlink processing section has a UI tone mixer 27 with a first input to receive the downlink signal from the downlink processing block 26, and a second input to receive the UI tone signal from the digital audio bus interface 32 that connects to the applications processor 4. The mixer 27 thus combines the selected UI tone signal with the far end user's speech into a single digital audio sequence that is to be heard by the near-end user (after being played back through any selected speaker at the output of the analog codec 9). In this embodiment, the mixer 27 is said to be inside the chain of audio signal processors that constitute the downlink portion of the signal processor 21.

An output of the UI tone mixer 27 is a digital audio signal containing the combined downlink speech and UI tone, and is fed to a first input of the echo canceller 23 (which is in the uplink signal path). This is also referred to as the reference input of the echo canceller 23. Another input of the echo canceller 23 receives the uplink signal coming from the uplink processing block 24 and containing speech of the near-end user. The echo canceller 23 is designed to reduce an amount of the far end user's speech as well as an amount of the UI tone that may be present in the uplink signal. As explained above, this may be due to acoustic reverberation or echo of the far-end user's speech and UI tone (emitted from any one of the speakers 12, 14) being picked up by the primary microphone 16. The enhanced uplink signal at the output of the echo canceller 23 may then be fed to another uplink processing block 32 before arriving at the digital audio bus interface 30. The latter transfers the incoming uplink data sequence to the baseband processor 20 or the applications processor 4, to be then transmitted to the far-end user's device.

Figure 3:
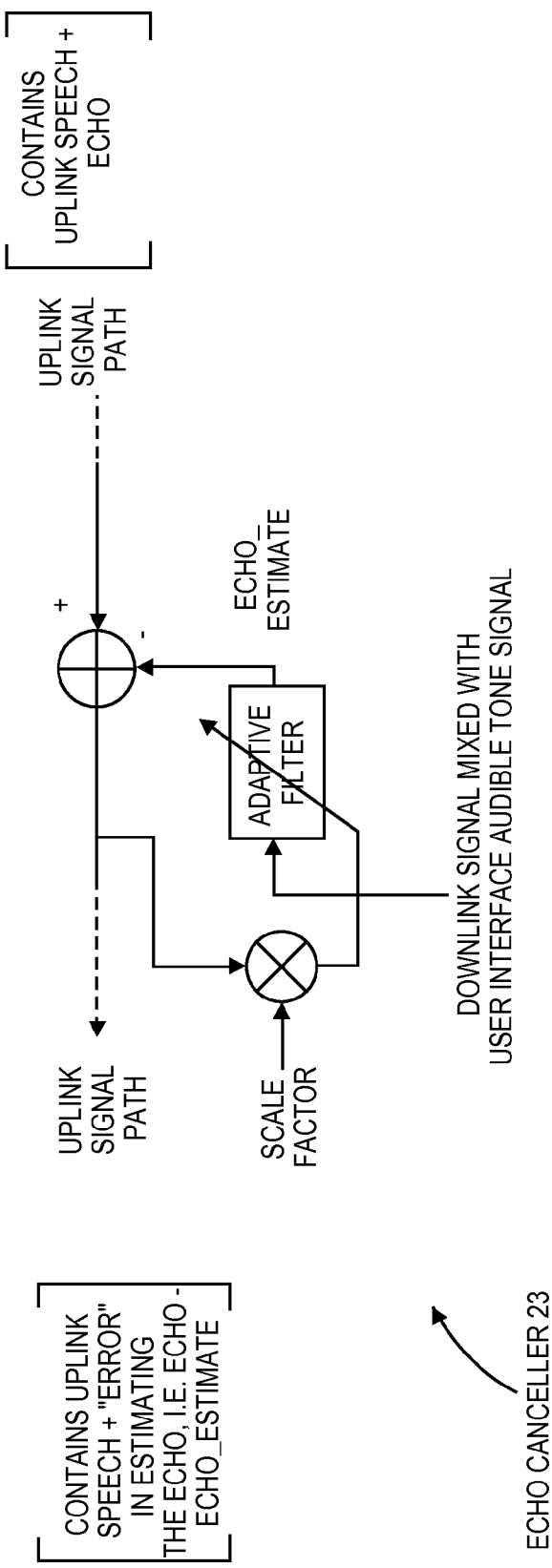
FIG. 3 is a block diagram of an echo canceller operating in the uplink signal path of the communications device.

The acoustic echo canceller 23 essentially tries to subtract out any echo of the far-end user's speech and UI tone, by estimating an "unknown" echo that is contained in the uplink signal path at its input. FIG. 3 depicts a block diagram of an example echo canceller 23. The uplink signal path at the input contains the desired uplink speech and the undesired echo. An adaptive filter is provided that is adapted, as part of a negative feedback closed loop control system, in order to converge onto an estimate for the undesired echo of the downlink speech and UI tone. This is achieved by providing as in input to the adaptive filter the downlink signal mixed with the UI tone. The transfer function of the adaptive filter is then modified based on an error signal, which represents the error in the previous estimate of the echo. This error may be generated by taking the difference between the incoming uplink signal and the echo estimate. The error then may be scaled prior to being applied to update the coefficients of the adaptive digital filter, so as to drive the error signal towards zero. In one embodiment, a least means squares algorithm may be used to adapt the filter for continuously trying to achieve the best possible echo estimate. In other embodiments, any of the large class of algorithms for adapting a linear digital filter may be used, including recursive least squares and the so-called fast-algorithm implementations thereof. Thus, ideally, the echo canceller should act quickly and produce a good estimate for the echo, so that the uplink signal path continuing from the output of the echo canceller will contain essentially no amount of the far-end user's speech and UI tone.

In the block diagram of FIG. 2, a side tone mixer 28 is present in the downlink signal path, to feed back a small amount of the near-end user's speech into the downlink signal. This allows a near-end user who is holding the earpiece speaker of the device 2 to her ear (handset mode) to hear her own voice, allowing her to adjust how loudly she speaks into the primary microphone. The mixer 28 has a first input coupled to receive an output signal of the UI tone mixer (the downlink speech combined with the selected UI tone), and a second input to receive a certain amount of the uplink signal. Note that in this example, the uplink signal has been taken or extracted from a point in the uplink signal path that is "before" the echo canceller 23. In contrast, the uplink processing block 32 is said to be operating "after" the echo canceller 23.

Figure 4:
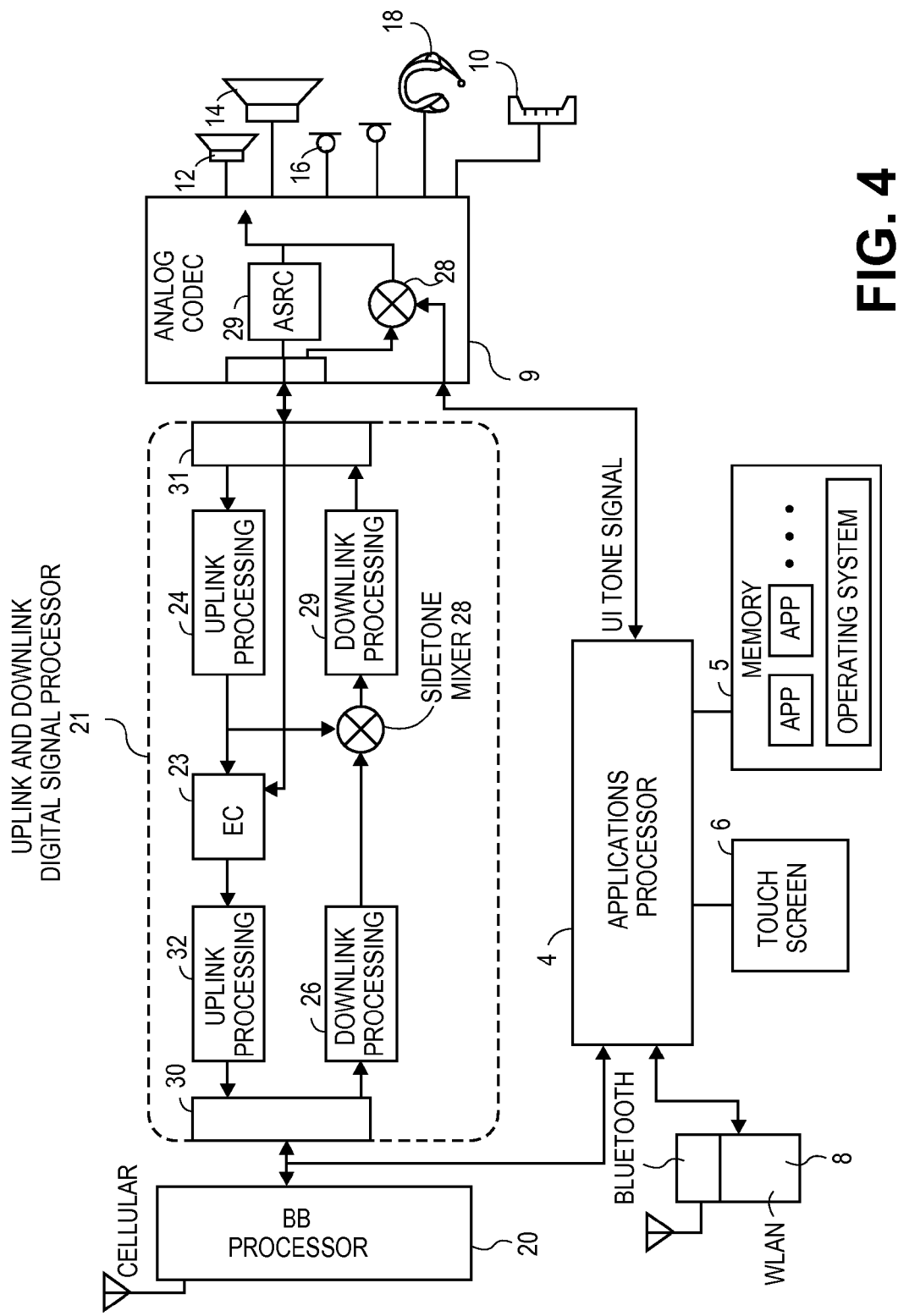
FIG. 4 is a block diagram of an example communications device in which the UI tone mixer is outside the chain of downlink digital audio processors.

In an alternate embodiment, which is depicted in FIG. 4, the mixing of the UI tone into the downlink path may be performed in the analog audio codec 9, instead of being performed in the uplink and downlink digital signal processor 21. In other words, the mixing is now done outside the chain of audio signal processors (or outside the downlink signal path) of the signal processor 21. In this embodiment, the UI tone is sent from the applications processor 4 to an additional digital audio port on the analog audio codec 9, separate from the bus interface 31 used to receive the downlink signal from (and send the uplink signal to) the signal processor 21. The analog audio codec 9 incorporates either a digital or analog implementation of the UI tone mixer 27, depicted in the figure as an analog or a digital mixer 28. The mixer 28 combines the UI tone signal (received initially in digital form through the separate digital audio port, from the applications processor 4) with the downlink signal coming from the last stage of the chain of audio signal processors that constitute the downlink portion of the signal processor 21. The output of the mixer 28 is then sent back to the uplink and downlink digital signal processor 21 (e.g., via the bus interface 31) where it is fed to the reference input of the echo canceller 23.

The embodiment of FIG. 4 may provide advantages including the ability to deliver UI tones with high fidelity (e.g., high sampling rate) to the near-end user, without requiring the uplink and downlink signal paths of the digital signal processor 21 to run at the same high rate, thereby saving critical resources of power consumption, memory, or integrated circuit die area in the signal processor 21. To accommodate different sampling rates between the UI tone signal and the uplink and downlink signal paths within the signal processor 21, an audio sample rate converter 29 may be inserted in the signal path between the output of the UI tone mixer 28 in the analog audio codec 9 and the reference input port of the echo canceller 23, to convert a sampling rate of the result of the mixing to a lower sampling rate (before the result is used for estimating the echo signal).

While the block diagram of FIG. 2 refers to circuit or hardware components and/or specially programmed processors, the depictions therein may also be used to refer to an algorithm or flow of a process or method for performing a call between a near-end user and a far-end user. The method would include the following digital audio operations performed during the call by the near-end user's communications device: processing a downlink digital audio signal from the far-end user's communications device (e.g., in block 26); processing an uplink digital audio signal (e.g., block 32) and then transmitting the uplink signal to the far-end user's device (e.g., the baseband processor 20 and its associated cellular transceiver and antenna), generating a user interface digital audio signal (e.g., the applications processor 4); and estimating an echo signal, by filtering the downlink digital audio signal and the user interface digital audio signal, and subtracting the estimated echo signal from the uplink signal prior to transmission to the far-end user's device (e.g., the echo canceller 23). Thus, a reduction in echo of the far end user's speech and any selected UI tone (that is being played through any speaker of the of near-end user's device) may be achieved. This occurs in the digital domain, in particular, referring now to FIG. 2, between the analog-digital conversion functions (with the analog codec 9) and the speech and channel coding-decoding or Internet packetization functions (within the baseband processor 20 or applications processor 4).

As explained above, an embodiment of the invention may be a machine-readable medium (such as microelectronic memory) having stored thereon instructions, which program one or more data processing components (generically referred to here as a "processor") to perform the digital domain operations described above including filtering, mixing, adding, subtracting, comparisons, and decision making. In other embodiments, some of these operations might be performed by specific hardware components that contain hardwired logic (e.g., dedicated digital filter blocks). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the block diagram of FIG. 2 is for a mobile communications device in which a wireless call is performed, the network connection for a call may alternatively be made using a wired Ethernet port (e.g., using an Internet telephony application that does not use the baseband processor 20 and its associated cellular radio transceiver and antenna). The downlink and uplink signal processors depicted in FIG. 2 may thus be implemented in a desktop personal computer or in a land-line based Internet telephony station having a high speed land-lined based Internet connection. The description is thus to be regarded as illustrative instead of limiting.

What is claimed is:

1. A multi-function communications device comprising
   a multi-function communications device housing having integrated therein:
   a microphone;
   a speaker;
   a display;
   memory having stored therein an operating system program and a plurality of application programs to perform functions of the multi-function communications device including visual voicemail web browser, email, digital camera, and telephony;
   a processor to execute the operating system and application programs to perform said functions and to generate a user interface audible tone signal that causes a sound to be heard by a near-end user of the device from the speaker and that is a result of an event occurring in one of the plurality of application programs being executed;
   a downlink digital signal processor to process a downlink audio signal received from a far-end user's communications device, the downlink signal causes speech of the far-end user to be heard by the near-end user from the speaker;
   an uplink digital signal processor to process an uplink audio signal picked up by the microphone and to be transmitted to the far-end user's device; and
   a first mixer having a first input to receive the downlink audio signal and a second input to receive the user interface audible tone signal,
   the uplink processor has an acoustic echo canceller having a first input to receive the uplink audio signal and a second input to receive an output signal from the first mixer, wherein the acoustic echo canceller is designed to reduce an amount of the far-end user speech and the user interface tone, in the uplink signal.

2. The device of claim 1 wherein the user interface audible tone signal is selected from the group consisting of an alert signal for when a message is received in the near-end user's inbox, and an alert signal for a mouse click input from the near-end user.

3. The device of claim 1 wherein the first mixer receives the downlink audio signal from the last one in a chain of audio signal processors of the downlink digital signal processor, and through a separate bus interface than the user interface tone signal.

4. The device of claim 3 further comprising a sample rate converter circuit coupled between an output of the first mixer and the second input of the echo canceller to convert a higher sample rate at the first mixer output to a lower sample rate at the input of the echo canceller.

5. The device of claim 1 wherein the downlink processor comprises a chain of audio signal processors including at least one of the group consisting of:
   an equalizer;
   an automatic gain control unit; and
   a compander or expander.

6. The device of claim 5 wherein the first mixer is inside the chain of audio signal processors of the downlink digital signal processor.

7. The device of claim 6 wherein the downlink processor further comprises:
   a second mixer having a first input coupled to receive the output signal from the first mixer and a second input to receive the uplink signal, to incorporate side tone into the downlink signal.

8. The device of claim 5 wherein the first mixer receives the downlink audio signal before the last one in the chain of audio signal processors.

9. The device of claim 8 wherein the downlink processor further comprises:
   a second mixer having a first input coupled to receive the output signal from the first mixer and a second input to receive the uplink signal, to incorporate side tone into the downlink signal.

10. The device of claim 7 wherein the uplink signal at the input of the second mixer is taken from a point in an uplink signal path that is before the echo canceller.

11. The device of claim 1 further comprising:
    an analog conversion circuit to interface between the downlink and uplink digital signal processors on one side and analog acoustic transducers on another side including the speaker and the microphone.

12. The device of claim 11 further comprising:
    a baseband processor coupled to provide the downlink signal as a pulse code modulated audio signal to the digital downlink processor, and to receive the uplink signal as a pulse code modulated audio signal from the uplink processor.

13. A mobile communications device comprising a multi-function personal handheld communications device housing having integrated therein:
    a microphone;
    a speaker;
    a display;
    memory having stored therein an operating system program and a plurality of application programs to perform functions of the mobile device including visual voicemail, web browser, email digital camera, and telephony;
    a processor to generate a plurality of user interface audible tone signals that cause user interface audible tones to be heard by a near-end user of the device from the speaker and that are a result of events occurring in the plurality of application programs when they are being execute;
    a downlink digital signal processor to process a downlink audio signal received from a far-end user's communications device;
    an uplink digital signal processor to process an uplink audio signal picked up by the microphone and to be transmitted to the far-end user's device;
    a baseband processor coupled to provide the downlink signal to the downlink processor, and to receive the uplink signal from the uplink processor; and an analog conversion circuit to interface between the downlink and uplink digital signal processors on one side and the microphone and the speaker on another side, wherein the uplink digital signal processor is to perform echo cancellation upon the uplink signal, by filtering the downlink audio signal and the user interface audible tone signal to generate an estimate of an echo signal and subtracting the echo signal from the uplink signal.

14. The device of claim 13 wherein the user interface audible tone signals are selected from the group consisting of a mouse click and a message alert.

15. The device of claim 13 wherein the baseband processor is to perform a communications function selected from the group consisting of: speech coding and decoding and channel coding and decoding.

16. The device of claim 13 wherein the downlink signal processor is to combine a side tone signal into a downlink signal path, as well as a user interface audible tone signal, wherein the side tone signal is combined at a point that is downstream of where the user interface tone signal is combined.

17. The device of claim 16 wherein the side tone signal is extracted from an uplink signal path before being combined into the downstream signal path, wherein the side tone is extracted at a point in the upstream signal path that is before the point at which echo cancellation is performed.

18. The device of claim 13 wherein the downlink signal processor combines a user interface audible tone signal with the downlink audio signal into a single digital audio stream that is then played by the analog conversion circuit through the speaker as a mono or monaural sound.

19. The device of claim 13 wherein the analog conversion circuit comprises a mixer having a first input to receive the downlink audio signal from the downlink signal processor, and a second input to receive a user interface audible tone signal from the processor,
wherein the analog conversion circuit is to receive the downlink audio signal from the downlink signal processor through a separate bus interface than the user interface audible tone signal.

20. The device of claim 19 wherein the analog conversion circuit is in a separate integrated circuit die than the downlink signal processor.

21. A method for performing a call between a near-end user and a far-end user, the method comprising
the following digital audio operations performed during the call by a processor, while the processor is executing a plurality of application programs, including a telephony application, that are stored in memory within the near-end user's multi-function communications device housing which also includes an integrated microphone and an integrated speaker:
processing a downlink digital audio signal from the far-end user's communications device as part of the telephony application being executed;
processing an uplink digital audio signal for transmission to the far-end user's device as part of the telephony application being executed;
generating a user interface digital audio signal to alert the near-end user through the speaker, as a result of an event occurring in the plurality of applications being executed; and
estimating an echo signal, by filtering the downlink digital audio signal and the user interface digital audio signal, and subtracting the estimated echo signal from the uplink signal prior to transmission to the far-end user's device.

22. The method of claim 21 further comprising:
mixing the downlink digital audio signal with the user interface digital audio signal, and using a result of the mixing for estimating the echo signal.

23. The method of claim 22 wherein the mixing is performed at a higher sampling rate and the processing of the uplink and downlink signals is performed at a lower sampling rate.

24. The method of claim 22 further comprising:
converting a sampling rate of the result of the mixing to a lower sampling rate, before using the result for estimating the echo signal.

25. The method of claim 23 further comprising:
converting a sampling rate of the result of the mixing to a lower sampling rate, before using the result for estimating the echo signal.

26. The method of claim 22 further comprising:
further mixing the result with a side tone signal.

27. The method of claim 26 further comprising:
extracting the side tone signal from the uplink digital audio signal, prior to mixing the side tone signal, wherein the side tone signal is extracted from an uplink signal path prior to an echo cancellation process being performed upon the uplink signal.

* * * * *